Patented Feb. 21, 1939

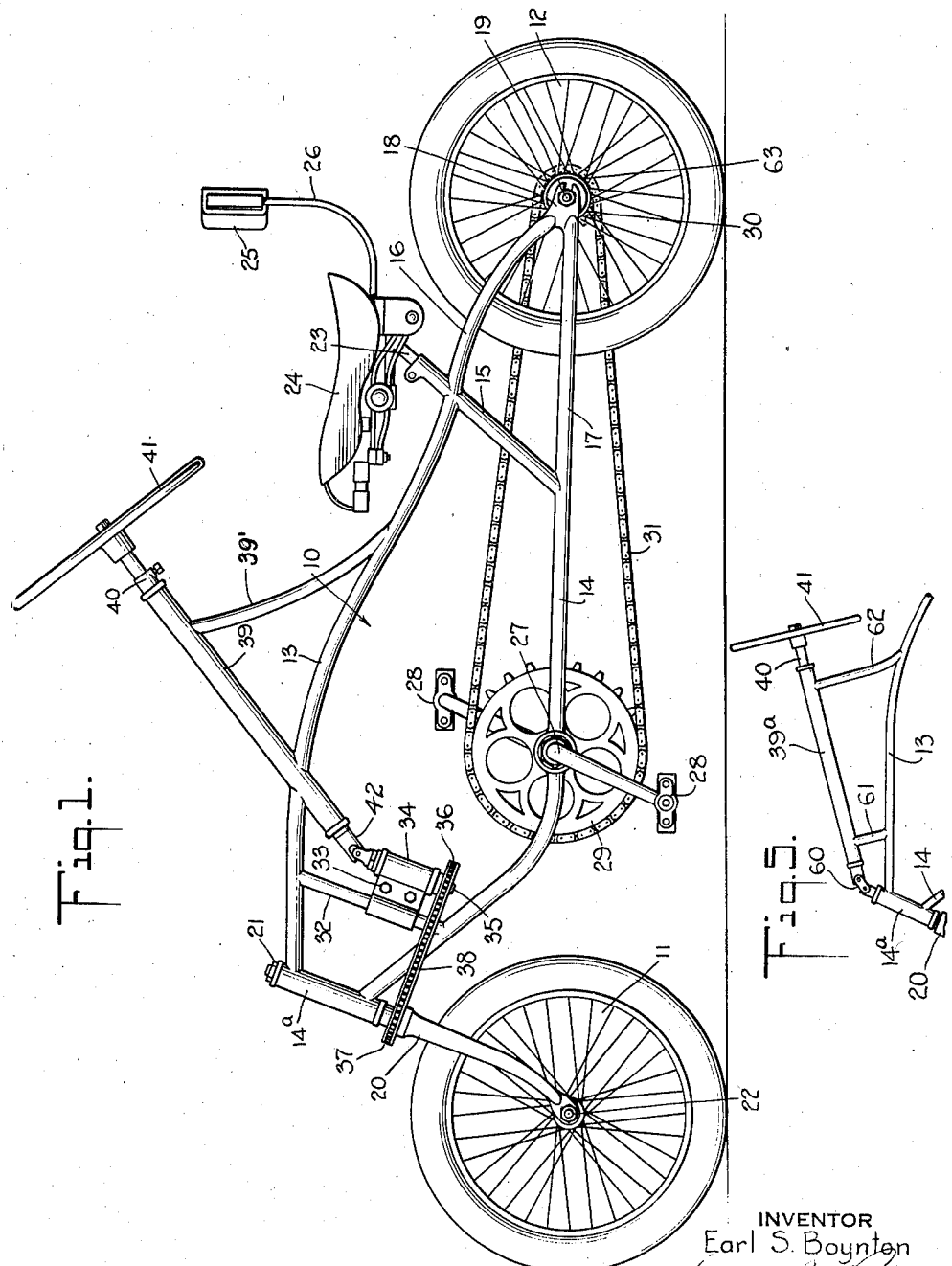

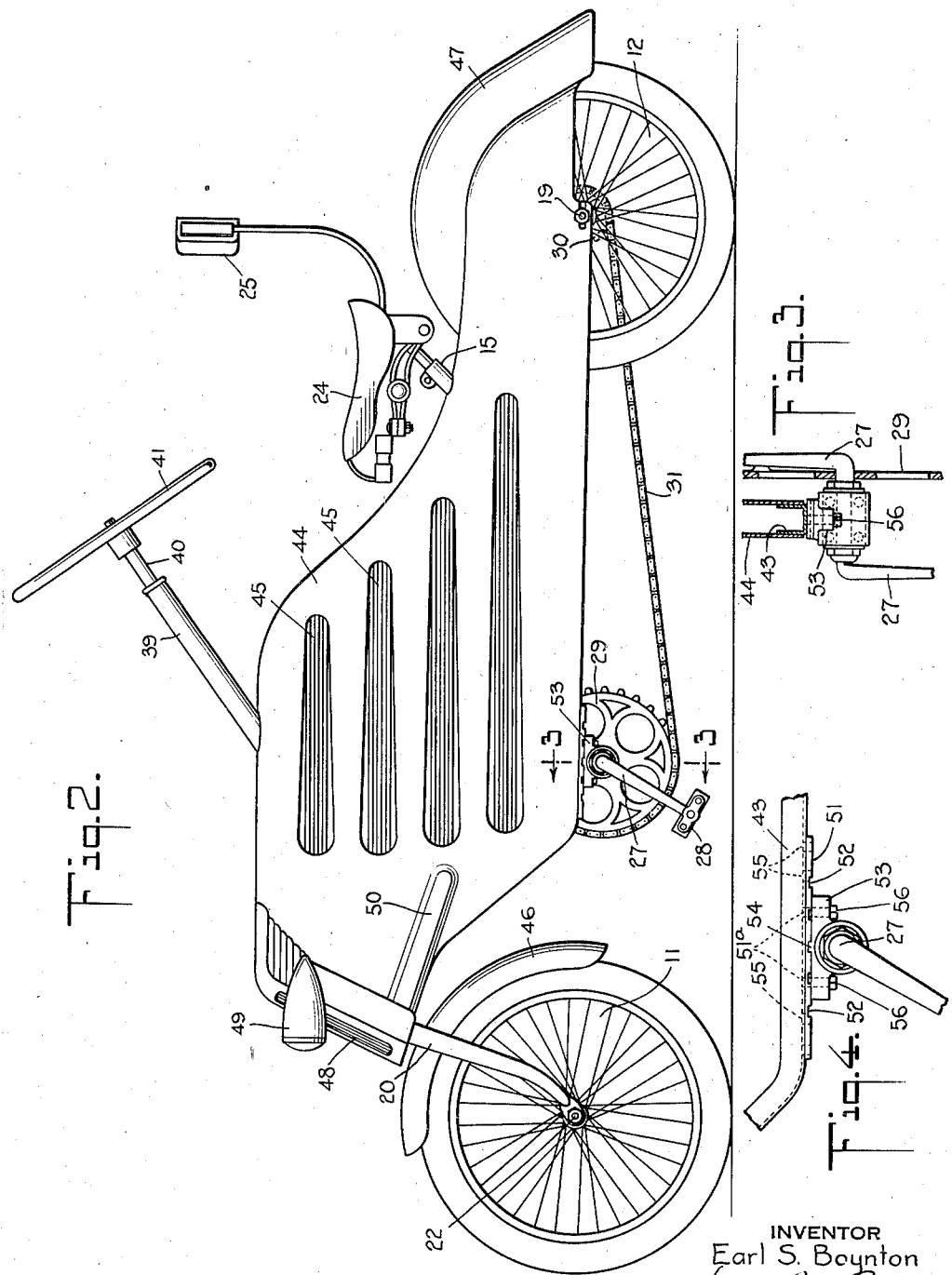

2,147,732

UNITED STATES PATENT OFFICE 2,147,732

TWO-WHEELED VEHICLE

Earl S. Boynton, East Orange, N. J.

Application June 7, 1935, Serial No. 25,372
Renewed January 7, 1939

4 Claims. (Cl. 280—261)

This invention relates to improvements in vehicles, and more particularly to an improved manually propelled two-wheeled vehicle, such as a bicycle.

An object of my invention is to enhance the safety factor of manually propelled vehicles, particularly for the preservation of human life, applicable not only to the rider of the vehicle but to pedestrians and others incident to the propulsion of the vehicle. This object is attained by positioning the seat for the rider vertically closer to the ground as compared with a so-termed "safety", i. e., diamond frame bicycle.

An object of my invention resides in the attainment of enhanced safety to the rider by positioning the propelling mechanism and the seat and its mounting, adjustable within a predetermined range of varied physical characteristics of the rider, i. e., varied "ages" or "sizes" of the rider and particularly the body of the rider, whereby the center of gravity of the combined "dead" and "live" load is located at a minimum distance from the ground, thus affording increased speed of travel with increased factor of safety.

An object of the invention is the coordination of the steering relative to the position of the rider when seated upon the seat of the vehicle to afford accuracy in steering at optimum convenience within the stated predetermined range.

An object of my invention attained concomitantly with the aforesaid objects, singly and plurally, is that of imparting hygienic and physiological attributes in the propulsion of the vehicle by pedalling by the rider, namely in positioning the seat for the rider and the pedals relative to one another to dispose the range of arc of movement of the legs of the rider at an acute angle to the horizontal.

In the attainment of the stated and other objectives of my invention, a markedly advantageous structural feature resides in the frame of the vehicle being of a truss formation whereby the major portion, if not substantially the whole, of the "live" load, is imposed upon the upper arched element of the truss formation.

By correlating the post of the seat bearing the rider, i. e., the "live" load, relative to the upper arched element of the truss formation, and by locating the range of movement of the legs of the rider when pedaling at an acute angle to the horizontal, and, further, by mounting the steering wheel or equivalent device to extend above the upper member of the frame, the steering wheel or equivalent device is positioned in optimum relation to the rider, namely, so to speak, in the lap of the rider, thereby affording maximal convenience in grasping the steering wheel or equivalent device, and affording unrestricted range of turning of the steering wheel or equivalent device to any desired range of angular rotation, an objective which is not attainable in present day accepted "safety" bicycles.

Further features and objects of the invention will be more fully understood from the following detail description and the accompanying drawings, in which—

Fig. 1 is a side elevation of a preferred embodiment of my invention.

Fig. 2 is a side elevation of another preferred embodiment of my invention, featuring the shrouding of the frame to conceal the same and affording simulation of an automobile or other type of conveyance, or in simulation of animal or other objects as preferred.

Fig. 3 is a detail sectional view on line 3—3 of Fig. 2, illustrating an improved form of adjustable mounting of the sprocket and pedals of the same.

Fig. 4 is a side elevation of the device shown in Fig. 3.

Fig. 5 is a detail side elevation of another embodiment of my invention, in particular another form of steering arrangement.

Referring to the drawings, and particularly to Fig. 1, the vehicle is illustrated as of the manually-propelled type; however, the propulsion of the vehicle may be had either wholly by an internal combustion or other motor or the like, as by suitably mounting such motor, for example, by mounting such motor upon the frame of the vehicle, or by attachment to the vehicle of a side-wheeled device upon which such motor is mounted, or by optionally applied combined motor and pedal drive.

Such preferred embodiment of my invention comprises in general a frame 10 of suitable configuration and component structure, mounted upon a front wheel 11 of suitable character and rear wheel 12 of suitable character, the propulsion of the vehicle being effected preferably through the intermediation of the rear wheel.

In the attainment of the above recited objects of my invention, the seat and the pedals or other support for the legs and the body of the rider are mounted relatively to the frame to position the rider's legs within a range forming an acute angle with the horizontal, and to locate the center of gravity of the rider when seated, as close to the ground as is afforded by the stated structure, whereby the center of gravity of the "live" and "dead" loads is at minimum spacing above a plane passing through the center of the front wheel and the center of the rear wheel.

The frame 10 may comprise an upper rail 13 and a lower rail 14 which are relatively long as compared to the height of the completed vehicle. The rails 13 and 14 are shown connected at their front ends to a steering head column 14a, and at their rear ends to a seat column 15. Also connected with the seat column 15 and forming extensions of the upper and lower rails 13 and 14 respectively are fork members 16 and 17 respectively, but one of each of such members being shown in Fig. 1. The ends of the fork members on each side of the fork are shown connected to a bearing plate 18 as by welding, brazing or in any other suitable manner. There are thus formed at the rear of the frame 10 two bearing members 18 in parallelism to one another; in such bearing members is secured a transverse rear shaft 19 on which is rotatably mounted the hub sleeve of the rear wheel 12, or equivalent.

Pivotally mounted in the steering head column 14a is the upper end of a front fork 20, such upper end being adjustably mounted on the steering head column 14a as by ball bearings secured in position by a nut 21. Rotatably mounted on a shaft 22 at the lower end of the fork 20 is the front wheel 11.

The seat column 15 lies at an acute angle to the horizontal and as will be obvious from an inspection of Fig. 1, such seat column 15 lies relatively adjacent to but in advance of the rear wheel 12. Adjustably mounted in the seat column 15, which is preferably hollow, is a seat post 23 on which is adjustably mounted a suitable seat 24. The structure of the seat 24, as shown, while novel in design and construction, forms no part of my present invention. Associated with and forming a part of the seat 24, is shown a back support 25 which is resiliently attached to the seat structure by a spring 26.

Rotatably mounted on the lower rail 14 of the frame 10 and relatively adjacent to the front wheel 11 is a crank shaft 27 provided with the usual pedals 28 and to which crank shaft is secured the sprocket wheel 29. The sprocket wheel 29 is in alignment with a sprocket wheel 30 secured to the rear wheel 12 and over the sprocket wheels 29 and 30 runs a sprocket chain 31 or equivalent, by means of which power is transmitted from the crank shaft 27 to the rear wheel 12.

Adjacent to and preferably substantially parallel to the steering head column 14a and extending between and connected to the upper and lower rails 13 and 14 respectively, is a tie member 32 on which is adjustably mounted by means of bolts 33, the bearing bracket 34. Rotatably mounted in the bearing bracket is a shaft 35 on the lower end of which may be secured a sprocket 36 or equivalent. Such sprocket 36 is in alignment with a similar sprocket 37 secured to the fork 20 at a point adjacent to the lower end of the steering column 14a. Over the sprockets 36 and 37 runs the sprocket chain 38, by means of which or equivalent, power is transmitted from the shaft 35 to the fork 20 to thereby rotate the fork in the steering column 14a for the purpose of steering the vehicle.

Secured to the upper rail member 13 and at a relatively acute angle with respect to the length of such chain 38 and the horizontal, so as to bring the upper end thereof into proximity to the seat 24, is a steering post column 39. Column 39 is preferably braced against frame member 13 by the indicated member 39'. Rotatably mounted in the steering post column 39 is a steering post 40 provided at its upper end with a steering wheel 41 and at its lower end with one end of a universal coupling member 42, the other end of such coupling member 42 being attached to the upper end of the shaft 35.

The diameter of the front and rear wheels 11 and 12 respectively is relatively small as compared to the overall length of the frame 10, and the overall length of the frame 10 is relatively long as compared to the height of such frame. Therefore, there is produced a vehicle of a relatively long wheel base and a low center of gravity. Further, the seat 24 being relatively adjacent to but in advance of the rear wheel 12 while the crank shaft 27 is relatively adjacent to the front wheel 11, the height of the seat 24 is at minimum distance above the ground on which the vehicle is located, and therefore a line passing through the center of the crank shaft 27 and the seat 24 is at a relatively acute angle with the horizontal whereby, power transmitted by the rider sitting on the seat 24, to the crank shaft 27 is applied in a substantially horizontal direction by the leg and thigh muscles of the operator. In thus operating the vehicle, the back of the rider is supported by the spring mounted back rest 35. Also, as the seat 24 is relatively close to the ground the center of gravity of the loaded vehicle, i. e., the live and dead load, is extremely low as compared with former vehicles of this type.

Referring now to Figs. 2, 3, and 4, wherein is shown another embodiment of my invention, 11 and 12, the front and rear wheels respectively, are supported on a framework which may be of tubular metal as in the illustration of Fig. 1, or may be of relatively deep channel members, the lower frame 43 of which is shown in Figs. 3 and 4, formed or welded together as preferred, and of the same general outline as the framework in Fig. 1. For appearance and for reducing wind resistance, I have shown this form of my invention and particularly the frame thereof, enshrouded by an encasing cover 44 such as sheet metal and provided with louvres 45 on its sides, and with front and rear mud guards 46 and 47 respectively. Also the shrouding 44 may be ornamented as indicated at 48 to simulate a radiator such as a radiator of an automobile. Also, such shrouding or cover 45 may have attached thereto head lamps 49. Similar to the embodiment shown in Fig. 1, the frame has attached thereto as a part thereof, the seat post standard 15, seat 24, back rest 25, the steering post column 39, steering post 40, and steering wheel 41, the general arrangement and relative position of these members being similar to that in Fig. 1. Also, there is provided the front fork 20 in which is mounted the front wheel 11.

The steering wheel 41 is connected to the fork 20 by suitable mechanism such for example as is shown in Fig. 1, and assuming such mechanism to be identical, the sprocket chain 38 is located within the grooves 50, formed in the shrouding or cover 44.

The shrouding or cover 44 may be removable from the framework, if preferred, or may be attached thereto so as to form an integral part thereof as by welding or in any other suitable manner, to impart added mechanical strength.

In such form of my invention the drive may be from the front sprocket 29 to the rear sprocket 30 by means of the sprocket chain 31, the sprocket 29 being attached to the crank shaft 27 provided with the pedals 28. In order to accommodate different leg lengths of different riders and to afford one size of vehicle for a range of different sizes of persons, i. e., of different lengths of leg, I have mounted the crank shaft 27 to be adjustable relative to the rear wheel axle 19 so as to vary the effective length from the seat 24 to the pedals 28. I accomplish this desirable result by securing to or forming as an integral part of the lower rail 43, and preferably on the under face thereof, member 51 having its lower face horizontal and provided at a plurality of points along its length and transversely thereof with grooves 52. At spaced intervals along the length of the member 51, I provide sets of drilled and tapped perforations 51a. Preferably also, I rotatably mount the crank shaft 27 in a pillow block 53 provided on its upper surface with a transverse member 54 adapted to seat in any of the transverse grooves 52. This pillow block 53 is drilled to allow passage of the threaded portion of bolts 54 and which bolts thread into the drilled and tapped perforations 51a in the member 51. Therefore, as appears from Figs. 2 and 4, I may shift the center of rotation of the crank shaft 27 either toward or from the rear wheel shaft 19 depending upon which of the transverse grooves the transverse member 54 on the pillow block 53 is associated with. It is of course obvious that the length of the sprocket chain 31 must be varied to meet the adjusted position of the crank shaft 27 with respect to the axle 19 of the rear wheel 12. However, the stated feature of adjustability enables a single size of vehicle such as is shown in Fig. 2 to suit a range of different sizes of persons having different leg lengths.

The strains imposed upon the frame of a manually propelled vehicle such as a bicycle, are very severe in the portions surrounding the pedal and driving sprocket assembly, and in the area of support of the steering mechanism, as the rider of such a vehicle uses the steering mechanism as a means of bracing himself against the reaction of his own efforts in pedaling the vehicle. It will be noted that in the frame structure disclosed in my invention, the pedal mechanism and the steering column bracing means are in the zone of the moment of inertia of the frame. The most rigid portion of the frame is therefore in the area of application of the severest stresses.

In Fig. 5 is indicated an optional form of suitable universal connection 60 between the lower end of the steering post 40 of the steering wheel 41 and the upper end of the fork 20, rotatably mounted in the steering head column 14a, thus dispensing with a sprocket chain and appurtenant driving and mounting parts shown in Fig. 1. Also, as shown in Fig. 5, the steering post column 39a may be supported by the upper rail 13 by frame extensions 61, 62.

It is understood that the steering post 40 is of the conventional or other approved construction to afford axial adjustment and accordingly adjust the steering wheel 41 relative to the steering post column and thus relative to the seat and the operator seated upon the seat.

As indicated at 63, I prefer to equip the vehicle with a built-in lock, which may be of the barrel type surrounding the coaster brake or hub of the rear wheel 12, for example.

Predicated upon the illustrated types of embodiments of my invention the frame of my two-wheeled vehicle is constituted of a unitary structure of truss formation. Further, by reason of the seat of the rider being connected to the upper, i. e., arched member of the truss, the load imposed by the weight of the rider is substantially uniformly distributed through and upon the essential components of such truss formation. Further, it is observed, assuming, as shown, the front wheel and rear wheel of substantially like diameter, my truss frame is higher at its front than at its rear.

By the construction and arrangement disclosed hereinabove, particularly relative to the securement of the steering post column to the upper rail and extending at an acute angle to the horizontal, an essential advantage is attained in that for a proper adjustment of the rider's seat and of the pedals for the range—in any given embodiment of my invention—of normal body length and leg length of the rider, the steering wheel is disposed between each knee of the rider at the top of the stroke and the body of the rider, i. e., so to speak, in the lap of the rider. Such positioning of the steering wheel insures optimum convenience of grasping and operating the steering wheel, and obviates all tendency of the rider to lean forward and/or sidewise common in the propulsion and steering of a conventional diamond frame bicycle.

As appears from the embodiment of my invention shown in Fig. 5, a one-to-one ratio of gearing is had between the shaft of the steering wheel and the shaft of the front wheel, whereby the stated positioning of the steering wheel, i. e., in the lap of the rider, affords as great an arc of movement of the steering wheel in selection of the course of travel as may be desired by the rider, or, as often occurs, usually in emergency, necessitated by traffic conditions.

It is further noted that for all positions of adjustment of the seat post, the upper end of the seat post is above the rear end of the frame, as well as above the upper rail of the frame. Also, it is observed, the back of the rider's seat is wholly supported by the seat, i. e., seat post.

I claim:

1. In a vehicle of the kind described, the combination of front and rear wheels, a truss formed frame comprising an upper arched frame member extending from its rear end adjacent the axis of the rear wheel substantially continuously upwardly, a lower frame member extending from its end adjacent the axis of the rear wheel to its front end, a steering head frame member interconnecting the front ends of said upper and lower frame members, a fork member extending downwardly from and having its head rotatably mounted in said steering head and rotatably carrying the front wheel, thereby disposing the front end of said upper frame member appreciably higher than its rear end, said upper arched frame member being spaced at a maximum from said lower frame member at a location more closely to the front wheel than the rear wheel, a seat supportedly carried by said upper arched frame member closely adjacent its rear end, a tie member connecting said upper and lower frame members and substantially parallel to said steering head, steering means comprising a steering post column secured to and penetrating said upper frame member and terminating adjacent said tie member, a steering shaft bearing bracket secured to said tie member beneath said upper frame member, a steering post rotatably mounted in said steering post column, a shaft rotatably mounted in said bearing bracket and operatively secured by positive mechanical linkage to said steering post for rotation thereby, the organization of said steering means serving to strengthen the said truss formed frame, means arranged to transmit movement of said shaft to said steering fork, and propeller means for the vehicle including a pedal operating crank rotatably mounted in said lower frame member relatively adjacent the front wheel, the effective length of the frame appreciably exceeding the effective height of the seat above the surface transversed by the wheels.

2. In a vehicle of the kind described, the combination of front and rear wheels of like effective diameters, a truss formed frame comprising an upper arched frame member extending from its rear end adjacent the axis of the rear wheel to its front end, said frame comprising further a lower frame member extending from its rear end adjacent the axis of the rear wheel to its front end and a steering head frame member interconnecting the front ends of said upper and lower frame members, a fork member extending downwardly from and having its head rotatively mounted relative to said steering head frame member and rotatively carrying the front wheel, a seat supportedly carried by said upper arched frame member closely adjacent its rear end, propelling means for the vehicle including a pedal operated crank rotatively mounted on said lower frame member relatively adjacent the front wheel, a hollow steering post column extending rearwardly of the said steering head frame member, said column braced against said top frame member, a steering wheel, a shaft for said steering wheel rotatively mounted at an angle acute to the horizontal in said hollow steering post column, and operating means interconnecting said steering wheel shaft with the head of said fork member of the front wheel, whereby said steering wheel is located to afford turning operation clear of said upper frame member and within convenient reach of the rider seated upon the seat and in the act of pedaling; said truss-formed frame arranged for greatest depth in the zone of the said pedal operated crank and the said steering post column bracing means, whereby the maximum rigidity of said frame occurs in the area of greatest stress incident to the pedaling of said vehicle.

3. In a vehicle of the kind described, the combination of front and rear wheels of like effective diameters, a truss formed frame comprising an upper arched frame member extending substantially continuously upwardly from its rear end adjacent the axis of the rear wheel to its front end, said frame comprising further a lower frame member extending from its rear end adjacent the axis of the rear wheel to its front end, and a steering head frame member interconnecting the front ends of said upper and lower frame members, a fork member extending downwardly from and having its head rotatively mounted relative to said steering head frame member and rotatively carrying the front wheel, thereby disposing the front end of said upper frame member appreciably higher than its rear end, said upper arched frame member being spaced at a maximum from said lower frame member at a location more closely to the front wheel than the rear wheel, a seat supportedly carried by said upper arched frame member closely adjacent its rear end, a back support secured to said seat, propelling means for the vehicle including a pedal-operated crank rotatively mounted on said lower frame member relatively adjacent the front wheel, a hollow steering post column extending rearwardly of the said steering head frame member, a steering wheel, a shaft for said steering wheel rotatively mounted at an angle acute to the horizontal in said hollow steering post column, operating means interconnecting said steering wheel shaft with the head of said fork member of the front wheel, said steering wheel shaft being substantially parallel to a line drawn through said seat back-support and the center of said crank, whereby said steering wheel is located to afford turning operation clear of said upper frame member and within convenient reach of the rider seated upon the seat and in the act of pedaling.

4. In a vehicle of the kind described, the combination of front and rear wheels of like effective diameters, a truss formed frame comprising an upper arched frame member extending from its rear end adjacent the axis of the rear wheel to its front end, said frame comprising further a lower frame member extending from its rear end adjacent the axis of the rear wheel to its front end and a steering head frame member interconnecting the front ends of said upper and lower frame members, a fork member extending downwardly from and having its head rotatively mounted relative to said steering head frame member and rotatively carrying the front wheel, thereby disposing the front end of said upper frame member appreciably higher than its rear end, said upper arched frame member being spaced at a maximum from said lower frame member at a location more closely to the front wheel than the rear wheel, a sprocket affixed to said fork member head, a seat supportedly carried by said upper arched frame member closely adjacent its rear end, propelling means for the vehicle including a pedal operated crank rotatively mounted on said lower frame member relatively adjacent the front wheel, whereby the effective length of the frame appreciably exceeds the effective height of the seat above the surface traversed by the wheels, a rotatable shaft having a sprocket operatively connected to said fork-member head sprocket, a hollow steering post column extending through said upper frame member and disposed adjacent said rotatable shaft, a steering post rotatably housed within said column, said steering post terminating in a steering wheel disposed within convenient reach of the rider seated upon the seat and in the act of pedaling, and a single universal joint connecting said steering post and said rotatable shaft; said rotatable shaft supported intermediate the upper and lower frame members, the angle between said steering post column and said rotatable shaft thereby being of the order of thirty degrees maximum.

EARL S. BOYNTON.